Oct. 14, 1958 R. A. FRYKLUND 2,856,021
TRANSDUCER MOUNTING SYSTEM
Filed Nov. 23, 1953 2 Sheets-Sheet 1

INVENTOR
ROBERT A. FRYKLUND
BY Elmer J. Gorn
ATTORNEY

Oct. 14, 1958  R. A. FRYKLUND  2,856,021
TRANSDUCER MOUNTING SYSTEM
Filed Nov. 23, 1953  2 Sheets-Sheet 2
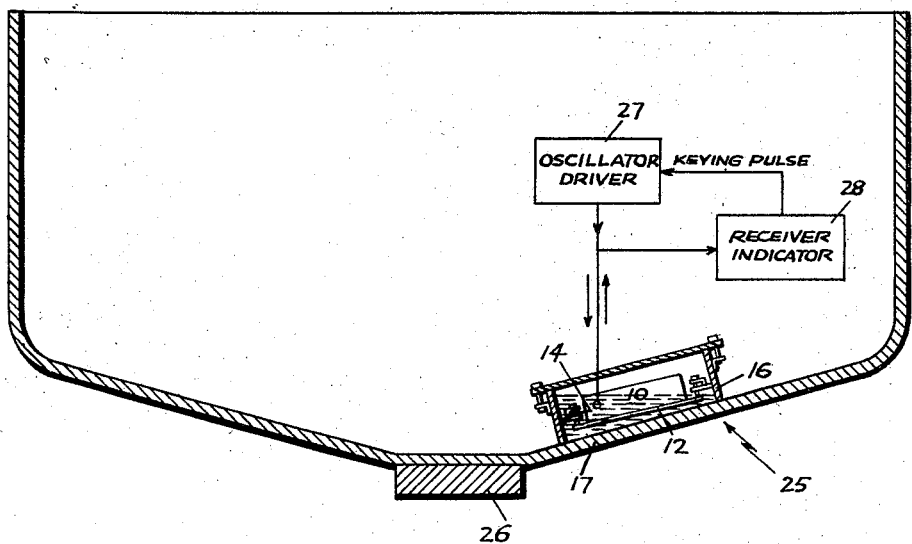
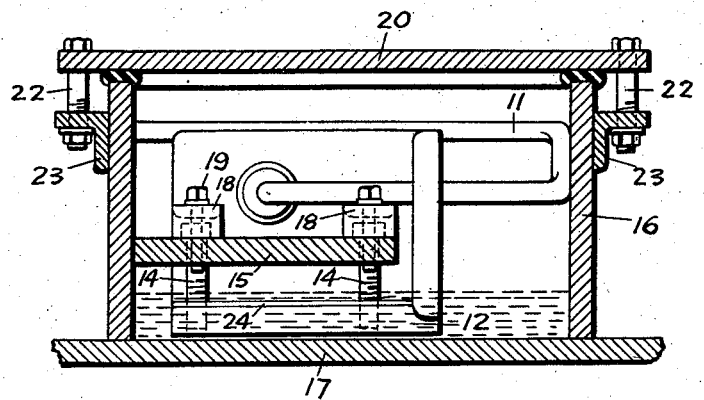
INVENTOR
ROBERT A. FRYKLUND
BY Emery Goan
ATTORNEY

United States Patent Office 2,856,021
Patented Oct. 14, 1958

2,856,021

TRANSDUCER MOUNTING SYSTEM

Robert A. Fryklund, Dedham, Mass., assignor to Raytheon Manufacturing Company, Waltham, Mass., a corporation of Delaware Application November 23, 1953, Serial No. 393,843

3 Claims. (Cl. 181—.5)

This invention relates to transducer mounting systems and more particularly to transducer mounting systems useful in sounding through the skin of a craft, such as, for example, the hull of a ship.

Patent No. 2,398,816, issued April 23, 1946, to E. E. Turner, Jr., discloses an underwater sounding system wherein compressional wave energy generated in a transducer is propagated through the skin of a ship by means of a system of parallel plates adapted to resonate as a substantially half-wave length resonator where one of the plates comprises the skin of the ship. For purposes of definition throughout the specification and claims, the word "transducer" means any device for interchanging electrical and sonic energy. A device constructed in accordance with said patent has a relatively long ringing time; that is, when a burst of energy is applied to the transducer, the resonant plate system will vibrate for a considerable time following cessation of the application of the electrical energy to the transducer. This ringing masks out returning echo signals which were to be picked up by the transducer and fed to a suitable indicating device for indicating the distance of the objects producing the echoes from the craft. The ringing particularly interfered with echos from close-in targets, such as the bottom of a shallow body of water.

This invention discloses that the ringing or persistance of sound in the radiating system may be minimized by making the stored energy of the system, comprising the parallel plate matching section, the coupling between the parallel plate matching section, and the transducer, as small as feasible, and, preferably, on the same order of magnitude as the stored energy of the transducer during operation thereof. Briefly, this is accomplished by positioning the transducer closely adjacent, and preferably substantially in contact with, a metal plate positioned inside the skin of the ship, said plate, in turn, being spaced a short distance therefrom. The space between the metal plate and the skin of the ship is filled with a suitable compressional wave energy transmitting medium, such as oil, and the combined thickness of the metal plate, the skin of the ship, and the oil positioned therebetween is made substantially equal to a half-wave length of compressional wave energy therein at the desired operating frequency of the transducer, which is preferably in the supersonic range. The oil is allowed to just cover the plate inside the skin of the ship and the plate extends for only a short distance beyond the edges of the transducer. As a result the energy storage of the radiating system is reduced to a minimum, and, therefore, the overall radiating system does not ring much more than would be the case if the transducer were directly presented to the water beneath the ship. This is particularly true if the spacing between the plates is carefully adjusted to produce substantially half-wave resonance of the plate and the skin of the ship, whereby an optimum impedance match is obtained between the transducer and the water beneath the ship. Under these conditions the impedance of the water is transferred and presented to the face of the transducer.

This invention also discloses that the transducer may be supported at three points by threaded bolt arrangement, whereby the transducer may be accurately adjusted with respect to the bottom of the ship.

This invention further discloses that a transducer mounted with the resonant plate support operates considerably better when driven with a pulsed continuous wave oscillation generator than when operated by shock excitation produced either mechanically, or by the discharge of a condenser into the transducer.

This invention further discloses that the angle at which the wave front of compressional wave energy enters the water through the skin of the ship may be adjusted by tilting the metal plate with respect to the skin of the ship. This tilting produces a leading phase of the compressional wave energy at the point where the plate is closest to the skin of the ship and a lagging phase of compressional wave energy where the plate is farthest from the skin of the ship. This tilting may be used to compensate for the rise in the bottom of a ship from the keel to the chine, whereby the pattern of the transducer may be directed substantially vertically downward toward the bottom, even though mounted on a rising portion of the ship bottom, or, if desired, the tilting may be utilized to direct the transducer pattern somewhat ahead of the ship.

Other and further objects and advantages of this invention will become apparent as the description thereof progresses, reference being had to the accompanying drawings, wherein:

Fig. 3 illustrates a transverse cross-sectional view of the device shown in Fig. 1 taken along line 3—3 of Fig. 1; and Fig. 4 illustrates a diagrammatic view of a transducer of the type shown in Figs. 1 through 3 mounted on the sloping bottom of a ship with the plate, to which the transducer is attached, tilted with respect to the skin of the ship to compensate for said slope.

Figure 1:
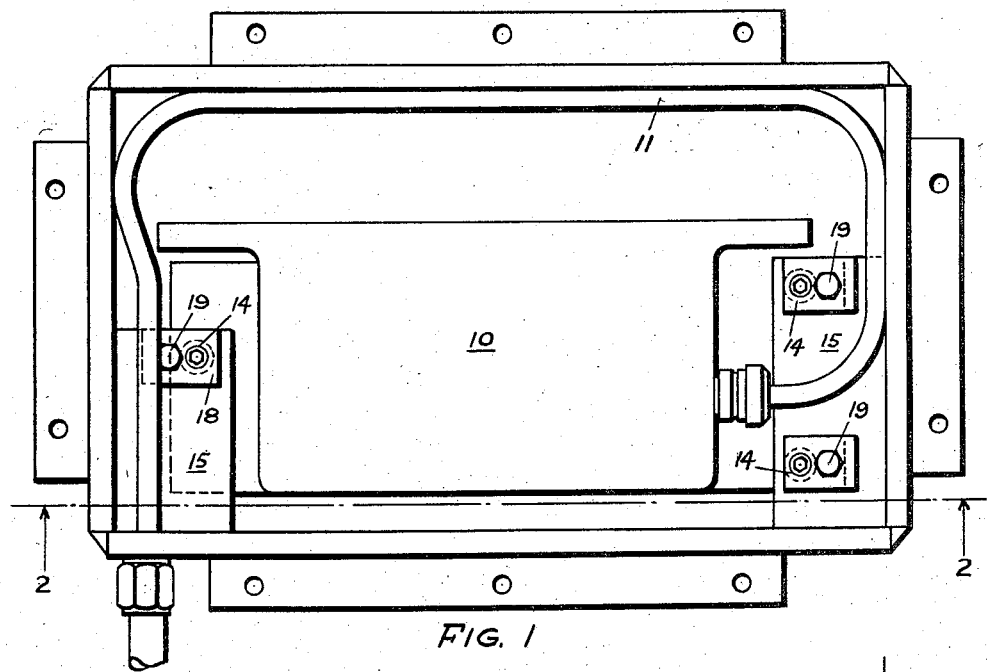
Fig. 1 illustrates a top plan view of a transducer mounted in accordance with this invention.
Figure 2:
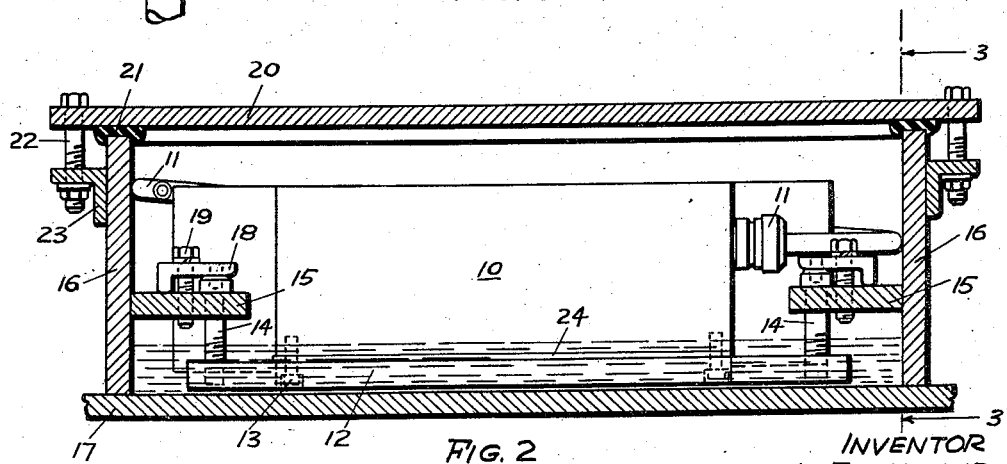
Fig. 2 illustrates a longitudinal cross-sectional view of the device illustrated in Fig. 1 taken along line 2—2 of Fig. 1.

Referring now to Figs. 1 through 3, there is shown a transducer 10 which may be, for example, of the type generally used today, wherein a case of hard rubber containing a plurality of crystals or magnetostriction elements connected to a cable 11. Transducer 10 has attached to the bottom thereof a metal plate 12, by means of screws 13 extending through plate 12, and threadedly engaging the case of the transducer 10. Plate 12 extends beyond the ends of transducer 10 and is supported by means of three bolts 14 threadedly engaging plate 12. Bolts 14 extend through bracket members 15 with the heads thereof resting on bracket members 15. Bracket members 15, in turn, are attached, as by welding, to the sides of a box 16, surrounding transducer 10 and plate 12, and rigidly attached, as by welding, to the metal skin 17 of a craft, such as a ship, on which the transducer is mounted.

By rotation of the bolts 14, the spacing between the plate 12 and the skin 17 of the ship may be adjusted, said spacing being normally uniform throughout the area of plate 12. When adjustment has been completed, the bolts 14 are prevented from moving by means of clamps 18 comprising sections of angle iron bolted to brackets 15 by bolts 19. Tightening of bolts 19 tightens the heads of bolts 14 against the brackets 15, thereby preventing movement thereof. The top of box 16 is closed by a cover 20, which engages a gasket 21 at the upper edge of box 16, and is rigidly secured thereto by means of bolts 22 extending through cover 20 and through angle iron brackets 23 securely attached to the outside of box 16. The interior of box 16 is filled with a fluid, preferably oil, to a level slightly above the upper edge of plate 12. For proper operation of the device, it is only necessary that the space between the plate 12 and the skin 17 be filled with oil but additional oil is added to insure that said space will always be full of oil even during rolling of the ship.

The spacing between the plate 12 and the skin of the ship 17 is adjusted by rotation of bolts 14, such that the combined thickness of the plate 12, skin 17 and oil positioned therebetween is substantially equal to a half-wave length of compressional wave energy through these members at the operating frequency of the transducer 10. Thus the transducer 10, which is normally designed for external mounting on a vessel, and, hence, is designed to be impedance matched to the characteristic impedance of the water, has the characteristic impedance of the water transferred thereto by reason of the half-wave length impedance transformation structure comprising the plate 12, skin 17, and layer of oil therebetween. In practice the bottom cover of the transducer 10, shown here as a thin plate 24, may be made integral with the plate 12, and the thickness of the impedance transformation structure will be increased by this thickness in that event. The transducer elements proper, such as crystals, which are contained inside the case, are positioned closely adjacent the bottom cover plate 24, and may, if desired, be attached directly thereto in accordance with well-known practice, or they may be mounted in the case of the transducer 10 and spaced slightly therefrom, in accordance with well-known practice. Usually the case of the transducer 10 is filled with oil in order to insure adequate coupling between the transducer elements and the bottom plate 24. It is to be clearly understood, however, that any different forms of transducers could be used, as, for example, magnetostrictive element transducers, and that transducers could be designed which were not, by themselves, impedance matched to the water. In these cases, the thickness of the impedance matching structure, comprising plates 12, skin 17, and the oil layer therebetween, would have its thickness adjusted such that the impedance of the transducer elements would be substantially matched to the impedance of the water at the desired operating frequency of the transducer.

Referring now to Fig. 4, there is shown diagrammatically an installation of the device illustrated in Figs. 1 through 3 on the sloping bottom of a vessel. The sloping bottom of the vessel is illustrated at 25 as being that portion of the skin of the ship adjacent the keel 26. This is a common type of construction of a vessel wherein the keel portion of the ship is substantially thicker than the remainder of the bottom thereof, and is, hence, unsuitable for the sounding of energy therethrough into the water from a transducer mounted inside the vessel. The box 16 is also mounted at an angle such that it is parallel to the portion 25 of the ship bottom. However, the transducer 10 is tilted, both with respect to vertical and with respect to the bottom portion 25 of the ship, said tilting being accomplished by adjustment of the bolts 14. This, in turn, adjusts the spacing between plate 12 and the skin portion 17 directly below plate 12, such that that edge of plate 12 which is closest to the keel 26, is placed further from the skin 17 than that edge of plate 12 which is farther away from the keel 26.

It has been found that if the average spacing of the plate from the skin 17 is adjusted for resonance as a half-wave impedance transformation structure, then adjustment of the spacing closer at one edge, for example by a few thousandths of an inch, causes the matching structure in this area to be off resonance, producing a phase lead in the output wave front. This lead will be, for example, substantially forty-five degrees if the spacing is decreased to a point where the energy transmitted through this region is three decibels less than the energy transmitted therethrough at peak resonance, and similarly, the wave front at the edge where the spacing is greater than the average by an amount necessary to produce a three decibel decrease in the energy propagated therethrough will lag the average energy by forty-five degrees. The amount which this will cause the beam to tilt from the normal to the ship's skin may be determined by the formula:

$$\alpha = \sin^{-1}\frac{\lambda}{4W}$$

where:

$\alpha$ is the angle between the axis of the beam and the normal to the ship's skin at the transducer,
$\lambda$ is the wave length of sound in the water, and
$W$ is the dimension of the face of the transducer perpendicular to the axis of the plate 12 about which the plate 12 has been rotated to produce the thick and thin spacings with respect to the skin of the ship. For example, if the transducer is operating at 21 kilocycles, $\lambda = 3.3$ inches, and hence, if the width $W=5$ inches, $\alpha$ will be on the order of ten degrees.

As is illustrated herein, the transducer 10 is driven from an oscillator driver 27, where is periodically keyed from an output pulse by a receiver indicator 28, to cause energization of oscillator 27 for a short time, on the order of a few milliseconds, thereby causing transducer 10 to radiate compressional wave energy through the hull into the water. Reflected echo signals are then transmitted back through the hull and picked up by the transducer 10 which converts them to electrical signals, which, in turn, are fed to the receiver indicator 28, in accordance with well-known practice. It is to be clearly understood that the receiver indicator 28, as well as the oscillator driver 27, may be of any of the well-known types. For example, the receiver indicator 28 may be a rotating neon light energized, both by the outgoing energy from the oscillator driver 27 and by the returning echo signals, with the distance of the object producing the echo signals being indicated by the distance around the path of rotation of the red light between the points of energization thereof, or the receiver indicator 28 may be of the recording type wherein a stylus is drawn across a sensitized paper and is energized by both the outgoing energy and the received echo energy to produce marks on the paper, in accordance with well-known practice.

This completes the description of the particular embodiment of the invention illustrated herein. However, many modifications thereof will be apparent to persons skilled in the art without departing from the spirit and scope of this invention. For example, the arrangement is not necessarily limited to underwater sound applications, but may be used in sounding through the hulls of other craft, such as aircraft. The transducer mounting system is not necessarily limited to use with echo ranging equipment, but could be used with communication equipment, or other underwater navigation equipment, and the particular type of support illustrated herein could have other types of supports substituted therefor. For example, the transducer 10 could be supported directly on the brackets 15 instead of through the plate 12. While the three point suspension is preferable, because of its stability and ease of adjustment, two or four point adjustments of the plate 12 could be utilized. In addition, other media could be substituted for the oil in the case 16, such as, for example a layer of compressible rubber or plastic, and the relative thicknesses of plates 12 and 17, while usually substantially equal in thickness, could have any desired ratio of thicknesses. Accordingly, it is desired that this invention be not limited to the particular details of the embodiments disclosed herein, except as defined by the appended claims.

What is claimed is:

1. A sound transducer mounting system comprising a transducer coupled to electrical signal translation means, and a substantially resonant impedance matching and coupling structure comprising a plurality of plates coupled to said transducer, the spacing between said plates being non-uniform over the area thereof to produce a change in the normal direction of radiation of said transducer, the maximum separation between the face of the outermost of said plates and the face of said transducer being substantially equal to a half wavelength of compressional waves at the operating frequency of said transducer.

2. A sound transducer mounting system comprising a transducer coupled to electrical signal translation means, and a substantially resonant impedance matching and coupling structure comprising a plurality of plates coupled to said transducer, the spacing between said plates being non-uniform over the area thereof to produce a change in the normal direction of radiation of said transducer, the maximum separation between the face of the outermost of said plates and the face of said transducer being substantially equal to a half wavelength of compressional waves at the operating frequency of said transducer, one of said plates comprising the skin of a craft.

3. A sonic echo ranging system comprising a source of electrical oscillations, a transducer fed by said source, and a substantially resonant impedance matching and coupling structure comprising a plurality of plates coupled to said transducer, the spacing between said plates being non-uniform over the area thereof to produce a change in the normal direction of radiation of said transducer, the maximum separation between the face of the outermost of said plates and the face of said transducer being substantially equal to a half wavelength of compressional waves at the operating frequency of said transducer.

References Cited in the file of this patent

UNITED STATES PATENTS

| | | |
|---|---|---|
| 1,008,340 | Howes | Nov. 14, 1911 |
| 2,147,649 | Haines | Feb. 21, 1939 |
| 2,398,816 | Turner | Apr. 23, 1946 |
| 2,430,013 | Hansell | Nov. 4, 1947 |
| 2,481,068 | Best | Sept. 6, 1949 |
| 2,567,407 | Slaymaker | Sept. 11, 1951 |